United States Patent [19]
Fukuda et al.

[11] Patent Number: 5,878,857
[45] Date of Patent: Mar. 9, 1999

[54] MULTI-PLATE CLUTCH HAVING THERMAL EXPANSION COMPENSATION MEANS

[75] Inventors: Yoshinobu Fukuda; Koji Kajitani; Hiroshi Mizukami, all of Neyagawa, Japan

[73] Assignee: Exedy Corporation, Neyagawa, Japan

[21] Appl. No.: 925,335

[22] Filed: Sep. 8, 1997

[30] Foreign Application Priority Data

Sep. 11, 1996 [JP] Japan ................... 8-2406770
Dec. 13, 1996 [JP] Japan ................... 8-334144

[51] Int. Cl.⁶ .................................. F16D 13/56
[52] U.S. Cl. .................... 192/70.27; 192/89.23; 192/109 A
[58] Field of Search ............. 192/70.14, 70.27, 192/89.23, 107 R, 107 M, 109 A, 109 B

[56] References Cited

U.S. PATENT DOCUMENTS

| | | | |
|---|---|---|---|
| 5,181,594 | 1/1993 | Nash | 192/70.27 |
| 5,415,262 | 5/1995 | Bernal et al. | 192/89.23 X |
| 5,505,286 | 4/1996 | Nash | 192/70.27 X |
| 5,638,932 | 6/1997 | Mizukami | 192/70.12 |

FOREIGN PATENT DOCUMENTS 2 056 589  3/1981  United Kingdom .

*Primary Examiner*—Richard M. Lorence
*Attorney, Agent, or Firm*—Shinjyu An Intellectual Property Firm

[57] ABSTRACT

A multi-plate clutch 1 includes a flywheel ring 2, a hub flange 6, drive plates 7 driven plates 8, clutch cover assembly 10, and a conical spring 90. The driven plates 8 are contactable with the drive plates 7. The clutch cover assembly 10 presses the plates 7 and 8 so as to be pressed into contact with each other and releases the pressure therebetween. The conical spring 90 has spring reaction force smaller than the pressure load of the diaphragm spring and absorbs the axial deformation of each of the members due to thermal expansion.

9 Claims, 10 Drawing Sheets

MULTI-PLATE CLUTCH HAVING THERMAL EXPANSION COMPENSATION MEANS

BACKGROUND OF THE INVENTION

1. Field of the Invention

The present invention relates to a multi-plate clutch, and more particularly to a multi-plate clutch for a racing car.

2. Description of the Related Art

In general, a multi-plate clutch used in a racing car or the like is provided with a first cylindrical portion that is configured to be attached to a flywheel. A hub flange having a second cylindrical portion is disposed radially inwardly of the first cylindrical portion. The hub flange is connected to a shaft. Drive plates and driven plates are engaged between the first and second cylindrical portions, respectively. A pressure mechanism selectively urges the drive and driven plates toward the flywheel. The pressure mechanism includes a clutch cover, a pressure plate and a diaphragm spring for biasing the pressure plate. The pressure mechanism is fixed to the first cylindrical portion and is provided on a side opposite the drive plates and the driven plates.

In a car race, since a good start may decide a race, the role of clutch, especially in setting a car in motion is significant. The rotational speed of the engine at the start of a race is very high, so that clutch engagement when setting the car in motion is extremely delicate and a driver is usually careful with a clutch operation. Just before the start of a race, the driver waits for a sign which indicates the start of the race while preventing the car from moving and keeps a certain amount of clutch torque in the clutch without fully engaging the clutch until the actual start of the race. Then, the driver releases the brakes, engages the clutch simultaneous with the sign indicating the start of the race, and then the car is put in motion. In this case, it is desirable that there is no change in clutch torque during the clutch in the engaging and dis-engaging process until the car is in motion.

However, when the clutch is in the engaging process for a long time with continued friction producing sliding between plates, the drive plates, driven plates and other members adjacent thereto are heated due to the friction. Thus, these members thermally expand in the axial direction and the pressure load of the diaphragm spring is relatively increased. The thermal expansion can cause abrupt increases in clutch torque even though the driver keeps a generally constant force on the clutch pedal. As a result, the transmitted clutch torque may exceed the amount of torque transmission desired by the driver at critical moments. Consequently, the drive plates and the driven plates undergo unusual wear due to friction. As well, the driver may discover the clutch is more or less fully engaged or disengaged than is desired at a critical time.

SUMMARY OF THE INVENTION

An object of the present invention is to stabilize the clutch engagement point in setting the car in motion at high rotational speed, and to prevent the abrupt increase of the clutch torque due to thermal expansion of each of the members in a multi-plate clutch, particularly in a multi-plate clutch for a racing car.

In accordance with one aspect of the present invention, a multi-plate clutch used in a car for selectively transmitting torque from a flywheel to a transmission, includes an input member configured for connection to a flywheel and an output member disposed concentrically within the input member for relative rotation with respect thereto. An outer circumferential portion of a first annular frictional plate is movable relative to the input member but is non-rotatably engaged with the input member. An inner circumferential portion of a second annular frictional plate is movable relative to the output member but is non-rotatably engaged with the output member. The second annular friction plate is contactable with the first annular frictional plate. A clutch pressing mechanism for selectively biasing the first and second annular frictional plates into engagement and disengagement with one another is attached to the input member. The clutch pressing mechanism is configured to provide a level of biasing force against the first and second annular frictional plates. A low-rigidity elastic member co-axially is disposed adjacent to at least one of the first and second annular frictional plates. The low-rigidity elastic member is configured to provide an elastic reaction force smaller than the level of biasing force from the clutch pressing mechanism against the first and second annular frictional plates. The low-rigidity elastic member is configured to absorb increases in axial dimensions of the first and second annular frictional plates and the clutch pressing mechanism due to thermal expansion.

Preferably, a maximum amount of axial elastic deformation of the low-rigidity elastic member is no greater than 0.2 mm.

Preferably, the low-rigidity elastic member is a conically shaped elastic member disposed between the first and second annular frictional plates and the clutch pressure mechanism.

Preferably, the clutch pressure mechanism includes a clutch cover disposed on one axial side of the input member opposite the flywheel such that the first and second annular frictional plates are confined between the clutch cover and the flywheel. The clutch cover is fixed to the input member. A pressure plate has a belleville spring shape and is disposed between the clutch cover and the first and second annular frictional plates. A diaphragm spring is supported by the clutch cover. The diaphragm spring biases the pressure plate toward the flywheel. The low-rigidity elastic member is the pressure plate.

Preferably, one of the first and second annular frictional plates is formed with a belleville spring shape and comprises the low-rigidity elastic member.

Preferably, the input member is formed with a first cylindrical portion and the output member is formed with a second cylindrical portion disposed inward of an inner circumferential side of the first cylindrical portion. The first annular frictional plate includes a plurality of frictional plates disposed between the first cylindrical portion and the second cylindrical portion. The outer circumferential portion of the first annular frictional plate is engaged with the first cylindrical portion so as to movable relative to the first cylindrical portion in the axial direction but not to rotate relative to the first cylindrical portion. The second annular frictional plate includes a plurality of frictional plates. The second annular plates are disposed alternatingly adjacent to the first annular frictional plates in the axial direction. The inner circumferential portion of the second annular frictional plates is engaged with the second cylindrical portion so as to be movable relative to the second cylindrical portion in the axial direction but not to rotate relative to the second cylindrical portion.

Alternatively, the low-rigidity elastic member is an annular plate formed with a plurality of projecting convex portions on opposing axial sides thereof Preferably, the low-rigidity elastic member is made of a composite material.

Preferably, the composite material includes carbon fiber.

The low-rigidity elastic member has elastic reaction force smaller than the pressure load to both annular plates, the pressure load allowing the torque required to start the car to be transmitted between the input member and the output member. Also, the low-rigidity elastic member absorbs the axial deformation amount of each of the members due to thermal expansion.

Just before the clutch engagement point, for example, at start in a car race, when the clutch is kept in the engaging and dis-engaging process with the engine at high rotation while the brake is operated, both annular frictional plates and each member composing the clutch pressing mechanism are heated due to frictional heat. As a result, these members thermally expand in the axial direction. In this type of multi-plate clutch disc, the low-rigidity elastic member absorbs the deformation of these members due to the thermal expansion. However, the elastic reaction force due to the elastic deformation of the low-rigidity elastic member is not sufficient enough for pressing both frictional plates into engagement with one another to thereby transmit a torque required to start movement of the car. Consequently, when the clutch is kept in partially engaged with the engine at high rotation just before the clutch engagement point, clutch torque is not abruptly increased. This make it possible to prevent the start of the car against the driver's will and to suppress the unusual wear of the first and second frictional plates.

Ideally, it is desirable that the elastic reaction force of the low-rigidity elastic member is constant with respect to the arbitrary deformation of the low-rigidity elastic member. In this case, the value of the elastic reaction force is always constant when the low-rigidity elastic member elastically deforms by absorbing thermal expansion, the pressure load applied to both annular frictional plates is not changed. In other words, the clutch torque transmitted does not vary when the clutch is in a partially engaged state.

When the low-rigidity elastic member elastically deforms greatly, extra cushioning effect is produced at clutch engagement and adversely effects on the time to the completion of the clutch engagement. Especially in a racing, it is desirable that all torque is transmitted at a moment of starting, it is advantageous that time lag should be suppressed to a minimum. In the multi-plate clutch of the present invention, in order to eliminate the extra cushioning effect described above, the minimum required dimension for absorbing the deformation due to thermal expansion is predetermined as the maximum amount of the elastic deformation of the low-rigidity elastic member. Thus, the clutch engagement point is stabilized and the time required for clutch engagement becomes short, thereby improving the acceleration at a start of a race.

As described above, the low-rigidity member may be degraded due to heat, since it is used under high temperature. In this case, carbon fiber has excellent heat resistance is used as a reinforcement and a composite comprising carbon matrix is used, so that the degradation of the low-rigidity elastic means is suppressed. Also, such composite has an advantage of light-weighted and wear-resistance.

DETAILED DESCRIPTION OF THE PREFERRED EMBODIMENT

First Embodiment

Figure 1:
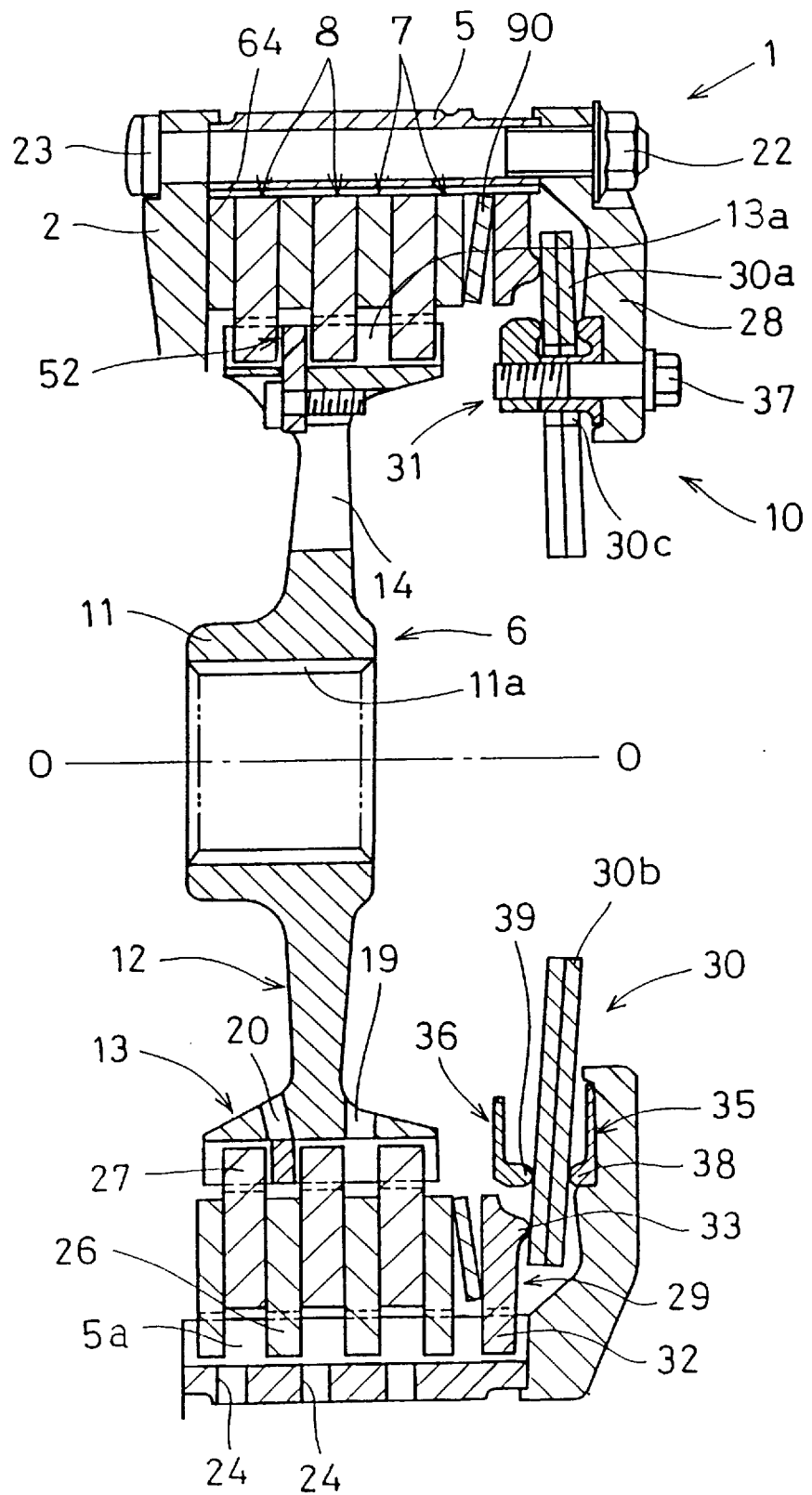
FIG. 1 is a cross-sectional view showing an automotive multi-plate clutch in accordance with a first embodiment of the present invention.

FIG. 1 is a cross-sectional view showing an automotive dry type multi-plate clutch 1 in accordance with a first embodiment of the present invention. The line O—O is a rotary axis of the multi-plate clutch 1. An engine (not shown) is disposed to the left of the multi-plate clutch 1 and a transmission (not shown) is disposed to the right of the multi-plate clutch 1 in FIG. 1. Hereinafter, the left side of FIG. 1 will be referred to as the engine side and the right side of FIG. 1 will be referred to the transmission side for direction orientation purposes.

The multi-plate clutch 1 is used for transmitting/interrupting a torque to a shaft (not shown) of the transmission from a flywheel 2 of the engine (not shown). The multi-plate clutch 1 is mainly composed of a flywheel ring 5 (first cylindrical portion) as an input member, a hub flange 6 as an output member, an annular frictional plate group 9 composed of a plurality of drive plates 7 (first annular frictional plates) and a plurality of driven plates 8 (second annular frictional plates) interposed between the flywheel ring 5 and the hub flange 6, a clutch cover assembly 10 (a clutch pressing mechanism) for selectively engaging and disengaging plates 7 and 8 from engaging with one another, and a conical spring 90 disposed between the annular frictional plate group 9 and the clutch cover assembly 10.

The hub flange 6 has a centrally located boss 11, a flange 12 extending radially outwardly and integrally from the boss 11, and a second cylindrical portion 13 integrally formed on an outer circumference of the flange 12. A spline hole 11a is formed in the center of the boss 11. The spline hole 11a is engaged with spline teeth of the shaft of the transmission. Thus, the hub flange 6 is not rotatable relative to the shaft of the transmission but is movable in the axial direction relative to the transmission shaft. The flange 12 of the hub flange 6 is provided with a plurality of circular air ventilation openings 14 at an interval in the circumferential direction. The second cylindrical portion 13 extends in both axial directions from the flange 12 (i.e. the second cylindrical portion 13 extends axially toward the engine side and axially toward the transmission side). A number of external teeth 13a extending in the axial direction are formed on the outer circumference of the second cylindrical portion 13.

Figure 2:
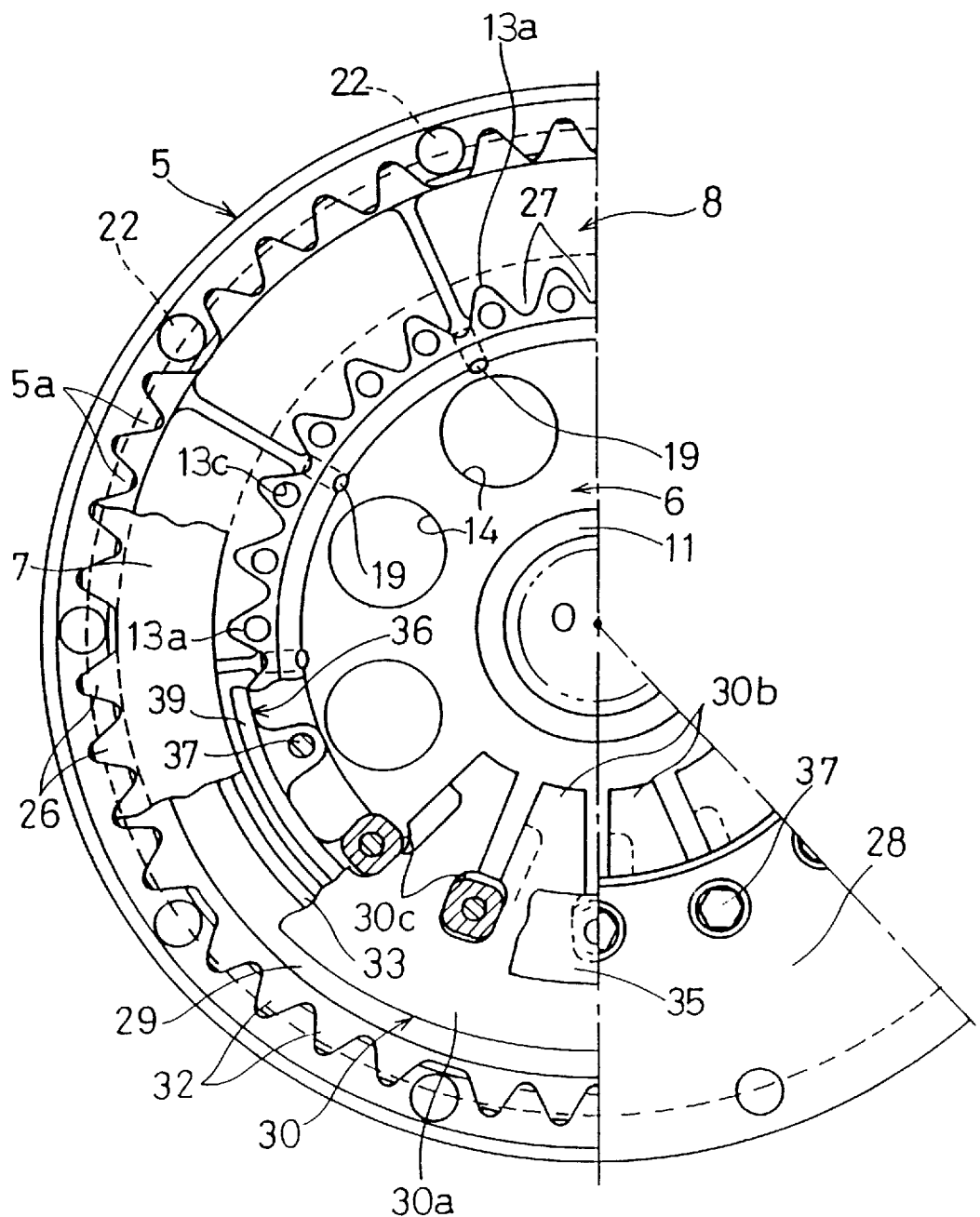
FIG. 2 is a fragmentary, part cutaway, part elevation view of the multi-plate clutch depicted in FIG. 1.

As shown in FIG. 2, a hole 13c extends through each external tooth 13a in the axial direction. A plurality of air passage holes 19 and a plurality of air passage holes 20 are respectively formed equidistantly in the circumferential direction in the second cylindrical portion 13 at the portion extending both sides in an axial directions. The air passage holes 19 and 20 respectively extend through the second cylindrical portion 13 generally in the radial direction, with the radially outward ends thereof open to the bottom portion of an adjacent pair of external teeth 13a.

The flywheel ring 5 is concentrically disposed on the radial outer side of the second cylinder portion 13. The flywheel ring 5 is fixed at its end on the left side of FIG. 1 to the flywheel 2 of the engine by a plurality of bolts 23. The flywheel ring 5 includes internal teeth 5a. Air passage grooves 24 are provided on the outer circumferential surface of the flywheel ring 5 at the plural positions (e.g. at three positions) at equally spaced apart intervals. As shown in FIG. 1, the air passage grooves 24 are provided on the radial outer sides of the driven plates 8. Each air passage groove 24 extends arcuately along the circumference of the flywheel 5. The bottom portion of each air passage groove 24 opens to the bottom surfaces of the plurality of the internal teeth 13a. The air passage grooves 24 extend in the circumferential direction, making it possible to effect improved heat dispersion and reduction of the weight of the flywheel ring 5.

The annular frictional plate group 9 is arranged between the inside of the flywheel ring 5 and the second cylindrical portion 13 of the hub flange 6. The annular frictional plate group 9 is axially interposed between the frictional surface 64 of the flywheel 2 and an annular pressure plate 29 (described below).

The annular frictional plate group 9 is composed of four drive plates 7 and three driven plates 8 arranged alternatingly in the axial direction. The drive plates 7 and the driven plates 8 are dry type carbon-made annular frictional plates and all arranged coaxially with the shaft of the transmission. The drive plates 7 are provided with radial projections 26 in their outer circumferential portion. The projections 26 are engaged non-rotatably with the internal teeth 5a of the flywheel ring 5 but are slidable in the axial direction. The driven plates 8 are provided with radial projections 27 in their inner circumferential portion. The projections 27 are engaged non-rotatably with the external teeth 13a of the second cylindrical portion 13 but are slidable in the axial direction.

The clutch cover assembly 10 is mainly composed of a clutch cover 28, an annular pressure plate 29 arranged within the clutch cover 28, a diaphragm spring 30 which is a pressing member for urging the pressure plate 29 toward the flywheel 2 (the engine side), and a support mechanism 31 for supporting the diaphragm spring 30 on the clutch cover 28.

The clutch cover 28 is fixed to an end face of the flywheel ring 5 by bolts 22. The clutch cover 28 is mainly made of aluminum to reduce its weight.

The pressure plate 29 is provided on the right side of FIG. 1 of the drive plate 7 disposed proximate to the clutch cover 28. The pressure plate 29 is provided with radial projections 32 at its outer circumferential portion. The projections 32 are engaged non-rotatably with the internal teeth 5a but are slidable in the axial direction. An annular raised portion 33 having a semicircular cross-section is formed on the inner circumferential portion of the pressure plate 29 on the transmission side.

The diaphragm spring 30 is formed of two overlapping disc-like members. The diaphragm spring 30 is composed of an annular elastic portion 30a and a plurality of lever portions 30b extending radially inwardly from the inner circumference of the annular elastic portion 30a. The lever portions 30b are provided at equal intervals in the circumferential direction. A slit is formed between adjacent lever portions 30b. A cutaway 30c having a relatively large width in the circumferential direction is formed in a radially outward portion of each slit.

The diaphragm spring 30 is in contact with the annular raised portion 33 of the pressure plate 29 at its outer circumferential portion of the annular elastic portion 30a to thereby urges the pressure plate 29 toward the flywheel 2 (the engine side).

A release mechanism (not shown) is disposed adjacent to the inner circumferential portion of the diaphragm spring 30. When the release mechanism pushes the ends of the lever portions 30b of the diaphragm spring 30 toward the flywheel 2, the outer circumferential portion of the annular portion 30a of the diaphragm spring 30 is separated away from the annular raised portion 33 of the pressure plate 29. Thus, the pressure of the diaphragm spring 30 for urging the pressure plate 29 toward the flywheel 2 is released. As a result, the clutch is dis-engaged.

The support mechanism 31 is mainly composed of a pair of first and second support annular members 35, 36 for supporting the inner circumferential portion of the annular portion 30a of the diaphragm spring 30, and a plurality of bolts 37 for fixing both of the annular support members 35, 36 to the clutch cover 28. The support members 35, 36 extend in the circumferential direction along the diaphragm spring 30, and have support portions 38 and 39 at their outer circumferential portions, respectively. The support portions 38 and 39 respectively have convex cross-sections such as semi circular shape in portions in contact with the diaphragm spring 30. The support portion 38 of the first annular support member 35 is in contact with the diaphragm spring 30 from the transmission side (the right side in FIG. 1), and the support portion 39 of the second annular support member 36 is in contact with the diaphragm spring 30 from the engine side (the left side in FIG. 1).

The conical spring 90 is an annular elastic member having a belleville spring shape, and is disposed between the plate proximate to the clutch cover assembly 10 (the right side in FIG. 1) and the pressure plate 29. The rigidity of the conical spring 90 is set in such a way that the reaction force thereof corresponds to the pressure load required to transmit a torque in a clutch engaging and dis-engaging process. The spring reaction force of the conical spring 90 is therefore is smaller than the pressure load of the diaphragm spring 30 in a state where the clutch is completely engaged. In a clutch engaged state, the conical spring 90 is elastically deformed to a maximum, and the slant of the conical shape becomes generally flat. The maximum amount of the elastic deformation of the conical spring 90 is set between 0.1 to 0.2 mm in accordance with the amount of thermal expansion of each component that would affect the relative position between the pressure plate 29 and the flywheel 2. Also, the conical spring 90 is designed so that its spring reaction force increases as little as possible when compressed in the axial direction.

Figure 3:
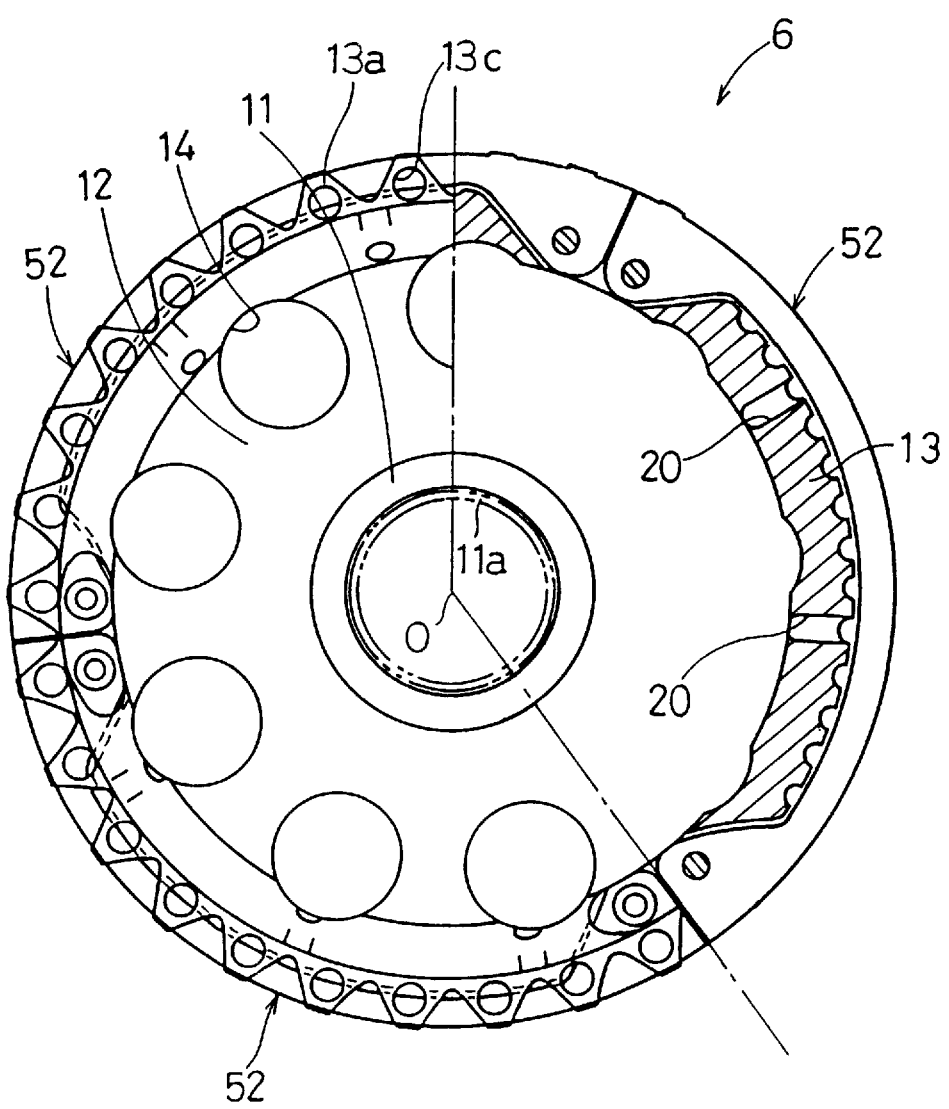
FIG. 3 is a part cross-section, part elevation view showing a hub flange of the multi-plate clutch depicted in FIGS. 1 and 2.

The hub flange 6 is movable in the axial direction with respect to the transmission shaft. Therefore, it is necessary to limit the axial movement of the hub flange 6. For this purpose, as shown in FIGS. 1 and 3, the second cylindrical portion 13 of the hub flange 6 is provided with three arcuate plates 52. Each arcuate plate 52 is disposed between the projections 27 of two of the adjacent driven plates 8. Since the above-mentioned flywheel 2 and the pressure plate 29 limit the axial movement of the drive plates 7 and the driven plates 8, a plurality of arcuate plates 52 are positioned between the projections 27 of the two driven plates 8 whose axial locations are limited, thereby limiting the axial location of the hub flange 6 within the predetermined range.

The operation will now be described.

In a clutch engagement state, the annular elastic portion 30a of the diaphragm spring 30 urges the pressure plate 29 toward the flywheel 2. Thus, the pressure plate 29 is pushed toward the annular frictional plate group 9, allowing the drive plates 7 and the driven plates 8 to be interposed between the pressure plate 29 and the flywheel 2 and to be pressed into contact with each other. As a result, a torque inputted from the flywheel 2 to the flywheel ring 5 is transmitted to the hub flange 6 via the drive plates 7 and the driven plates 8, and further outputted to the transmission shaft via the hub flange 6.

An operation of the clutch engagement upon the start in a car race will now be described. First, with the brakes engaged, a driver will typically increase the rotation speed of the engine, adjust the position of the clutch and checks the point of clutch engagement. Since the spring reaction force of the conical spring 90 corresponds to the pressure load required to transmit torque, the point where the conical spring 90 starts elastically deforming is a point during the clutch engagement and disengagement. Prior to clutch engagement in a race, the driver typically keeps the clutch at a point where partial engagement is attained. Keeping the clutch in a partially engaged state produces heat due to the friction experienced between the plates 7 and 8. As a result, both plates 7, 8 and the surrounding members thermally expand. The force in the axial direction which results from thermal expansion of the various components is larger than the pressure load required for the clutch to become fully engaged and transmit a torque. Therefore, in the absence of the conical spring 90, the drive plates 7 and the driven plates 8 are compressed with one another and clutch-transmitting torque is abruptly increased due to the thermal expansion. However, in accordance with the multi-plate clutch 1 of the present invention, the conical spring 90 absorbs a significant amount of thermal expansion by elastically deforming. This makes it possible to prevent the abrupt increase of the torque due to the thermal expansion.

Further, the multi-plate clutch 1 is designed so that the spring reaction force of the conical spring 90 does not increase when the conical spring 90 is deformed, so that the changes in clutch torque in a clutch engaging and disengaging process are minimized.

When the race car driver sees a signal that the race has started, the driver releases the brake and engages the clutch. The conical spring 90 is then deformed so that the slant thereof becomes flat. In other words, the conical spring 90 deforms to a maximum and gets interposed between the pressure plate 29 and the clutch plate 7 as a rigid body. In this case, a cushioning effect during clutch engagement is produced by the elastic deformation of the conical spring 90 between the elastic deformation due to the absorption of the thermal expansion and the maximum elastic deformation. This cushioning effect delays the clutch engagement, and during start up in a race may not be desirable. In the conical spring 90 of the present embodiment, the maximum amount of the elastic deformation of the conical spring 90 is determined by calculating the axial dimension of the amount of thermal expansion expected from the various elements of the clutch mechanism. Therefore, the extra cushioning effect is suppressed. Thus quick engagement of the clutch at the start of a race is maintained.

In order to put the clutch in a clutch dis-engaged state, the release mechanism (not shown) pushes the end of the lever portion 30b of the diaphragm spring 30 toward the flywheel 2, thereby moving the outer circumferential portion of the annular elastic portion 30a in a direction away from the pressure plate 29. Thus, the pressure between the drive plates 7 and the driven plates 8 is released to bring the clutch into a clutch dis-engaged state.

Second Embodiment

Figure 4:
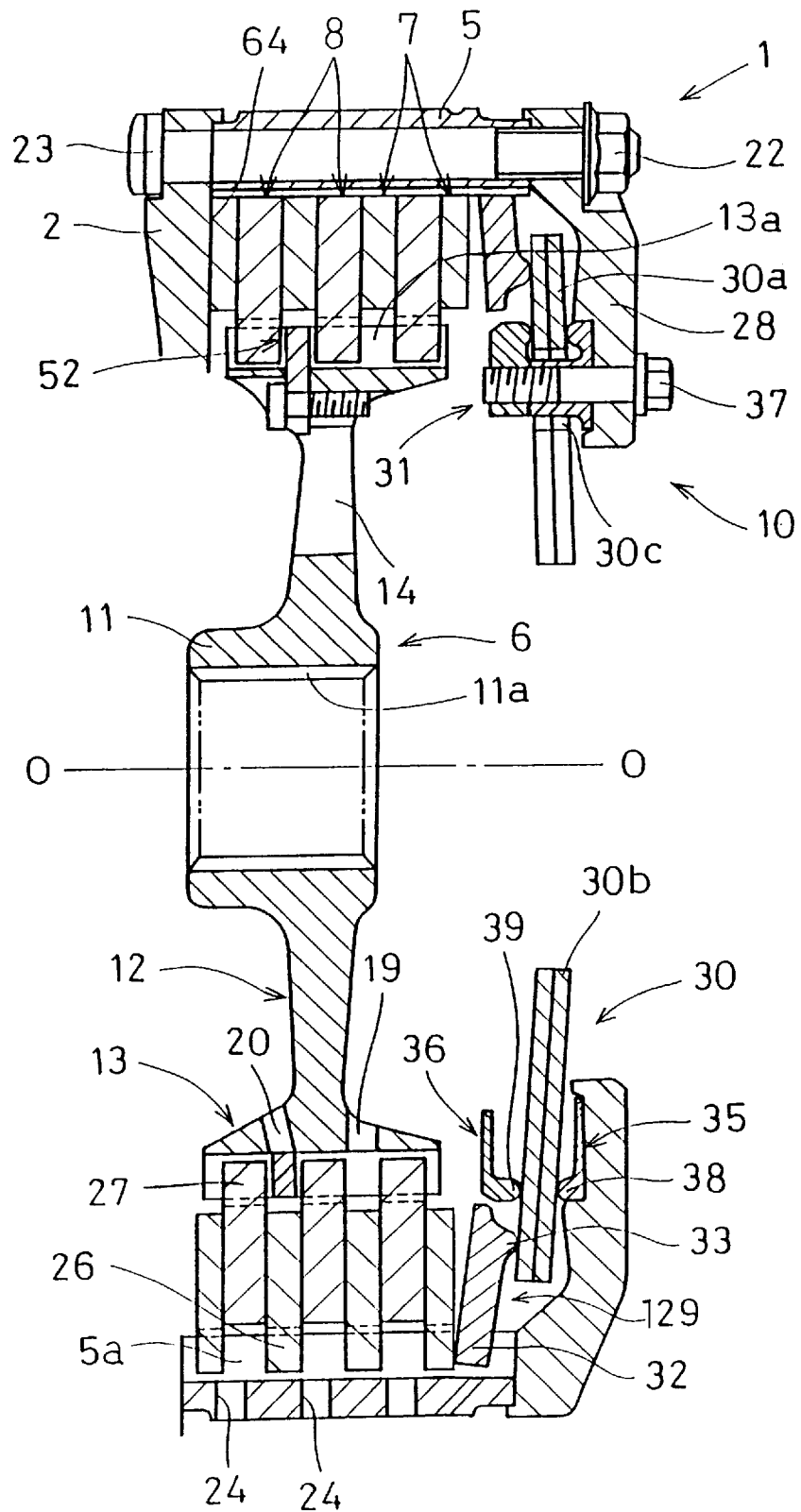
FIG. 4 is a cross-sectional view, similar to FIG. 1, showing a multi-plate clutch in accordance with a second embodiment of the present invention.

Although the thermal expansion of each component is absorbed by the conical spring 90 in the first embodiment, the thermal expansion of each component may be absorbed by an elastically deformable pressure plate 129 shown in FIG. 4. The pressure plate 129 includes properties similar to the conical spring 90 discussed above with respect to the first embodiment. In the second embodiment shown in FIG. 4, the pressure plate 29 is molded with a conical shape.

Third Embodiment

Figure 5:
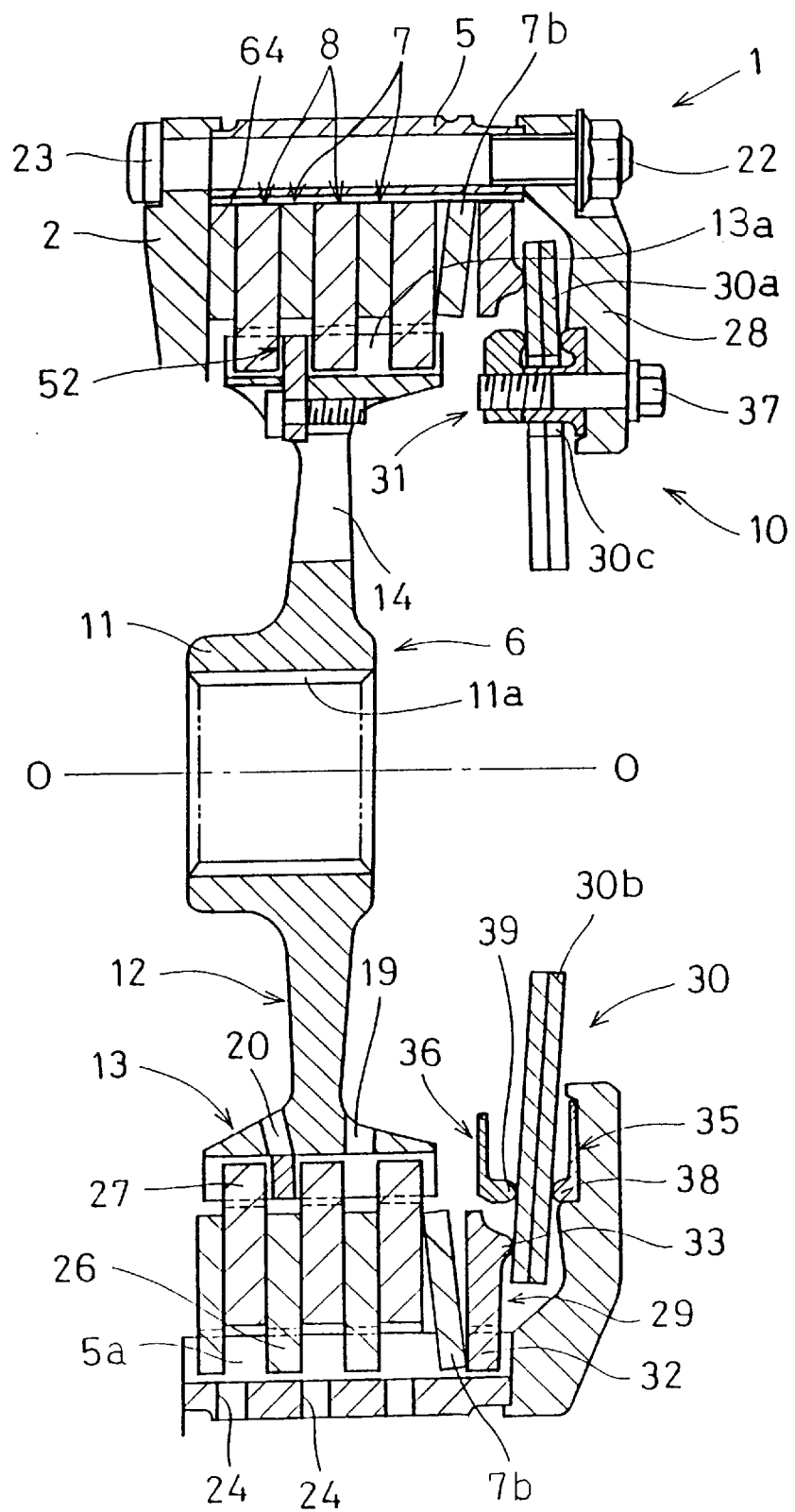
FIG. 5 is a cross-sectional view, similar to FIGS. 1 and 4, showing a multi-plate clutch in accordance with a third embodiment of the present invention.

Although the thermal expansion of each component is absorbed by the conical spring 90 in the first embodiment, the thermal expansion may be absorbed by one of the plates 7 or 8 in the annular frictional plate group 9 being formed with a conical shape. For instance, as is shown in FIG. 5, the plate 7b is molded with the conical shape. Thus, the plate 7b has generally the same properties and function as the conical spring 90 described above.

The clutch plate 7b of the clutch plates 7 is disposed approximate to the pressure plate 29 and is molded into the conical shape to be an elastic member of low-rigidity.

Advantages

In the multi-plate clutch, particularly the multi-plate clutch for car race in accordance with the present invention, the low-rigidity elastic means absorbs the deformation of each component due to the thermal expansion generated upon keeping the clutch in the engaging and dis-engaging process. This makes it possible to stabilize the clutch engagement point upon high speed rotation and to prevent the abrupt increase of the clutch torque due to the thermal expansion of elements of the clutch mechanism.

Fourth Embodiment

Figure 6:
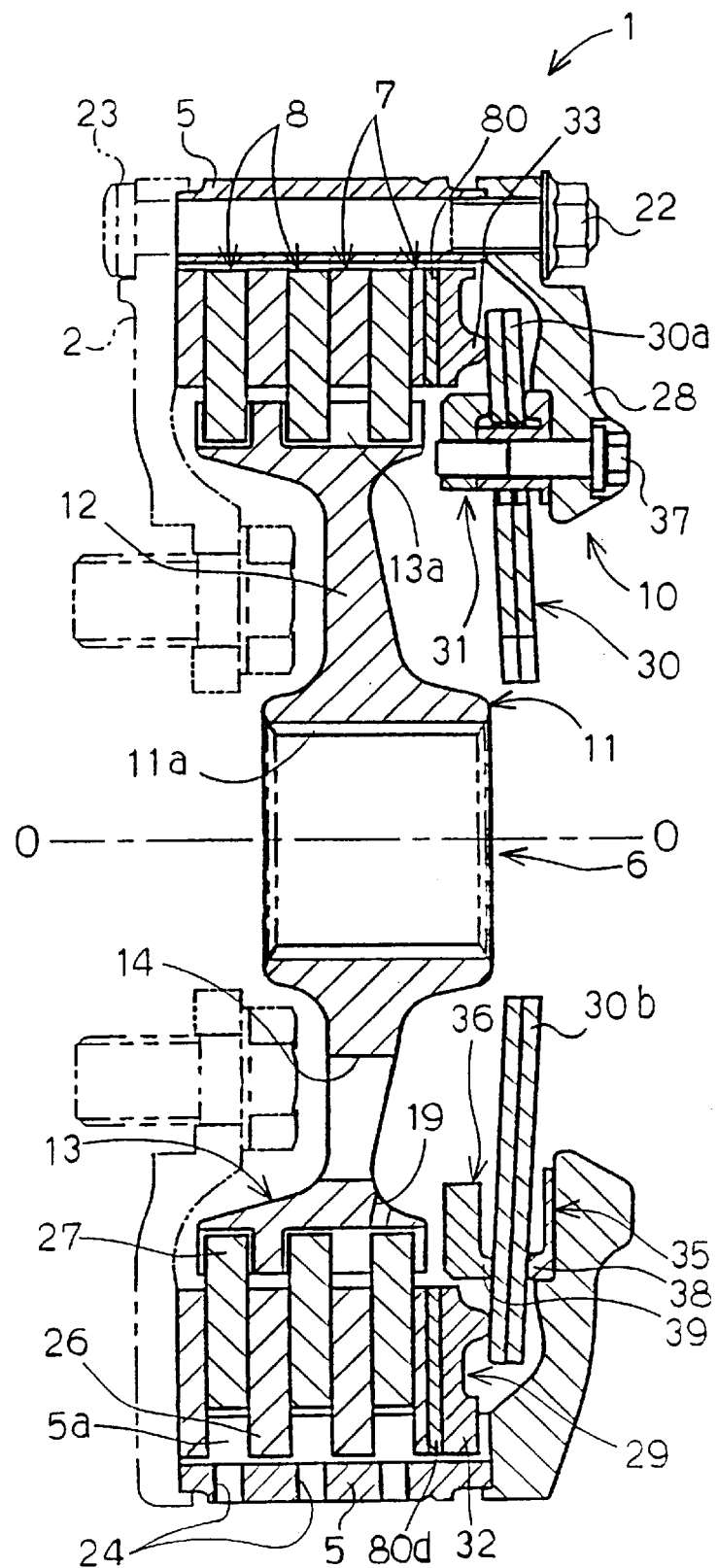
FIG. 6 is a cross-sectional view, similar to FIGS. 1, 4 and 5 showing a multi-plate clutch in accordance with a fourth embodiment of the present invention.
Figure 7:
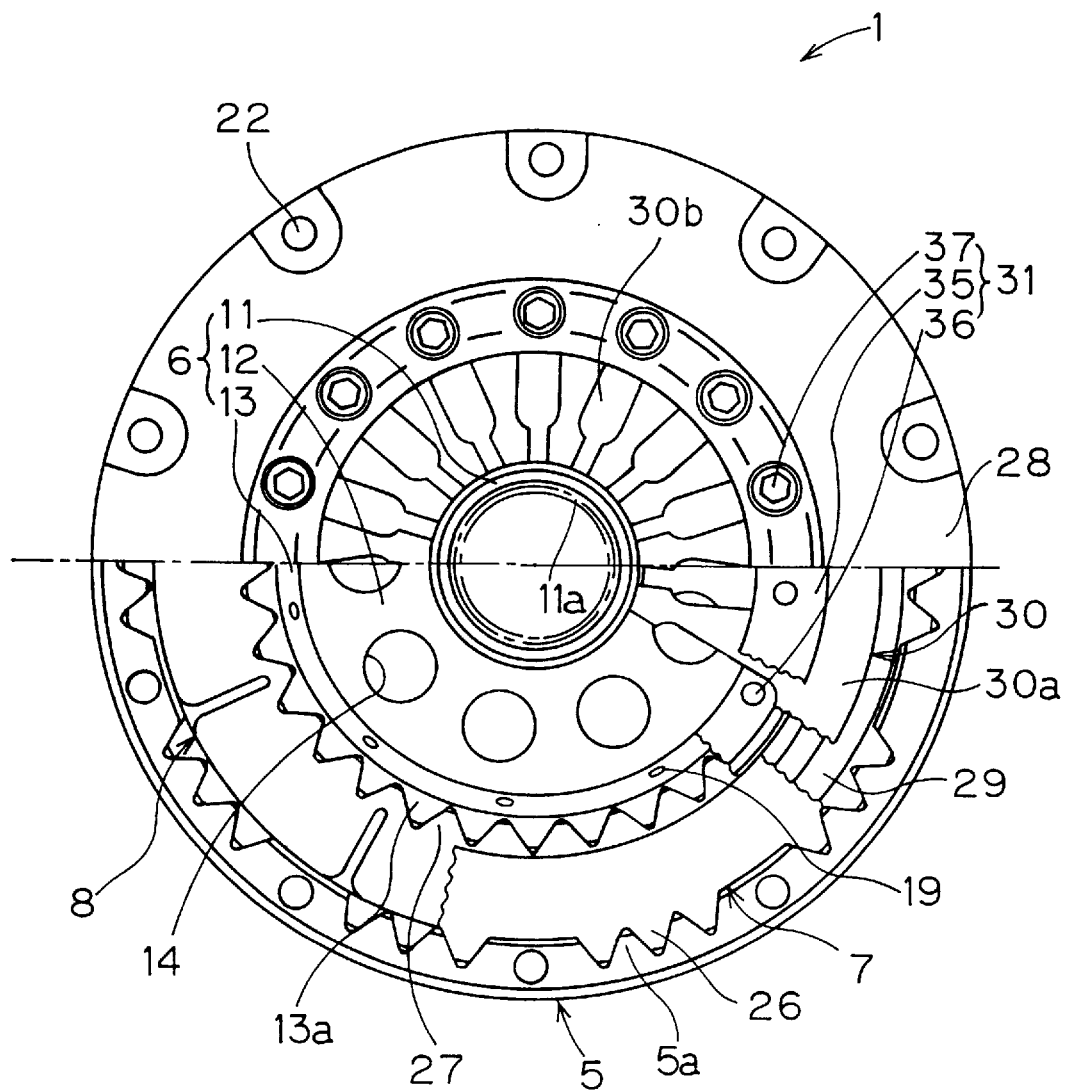
FIG. 7 is a part cutaway, part elevational view of a multi-plate clutch in accordance with the fourth embodiment of he present invention.
Figure 8:
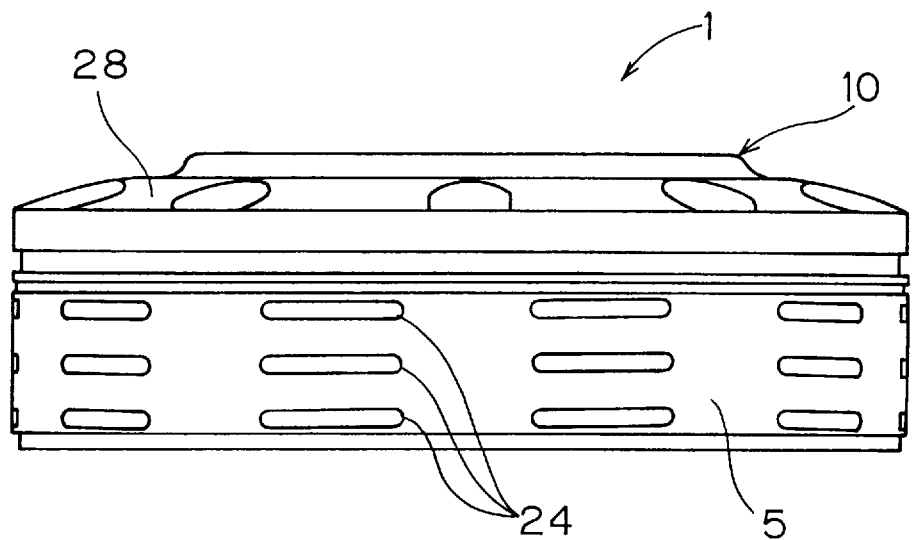
FIG. 8 is a side elevational view of the multi-plate clutch depicted in FIG. 7.

An automotive dry type multi-plate dry clutch 1 in accordance with a fourth embodiment of the present invention is shown in FIGS. 6, 7 and 8. In the following description, the members equivalent or similar to those of the first embodiment are indicated by the same reference numbers as in the first embodiment.

The multi-plate clutch 1 is mainly composed of a flywheel ring 5 (first cylindrical portion) as an input member, a hub flange 6 as an output member. An annular frictional plate group 9 includes a plurality of drive plates 7 (first annular frictional plates) and a plurality of driven plates 8 (second annular frictional plates) which are interposed between the flywheel ring 5 and the hub flange 6. A clutch cover assembly 10 (a clutch pressing mechanism) selectively engages and dis-engages the plates 7 and 8 from engaging with one another. A composite member 80 (a low-rigidity elastic means) is disposed between the annular frictional plate group 9 and the clutch cover assembly 10.

The hub flange 6 has a centrally located boss 11, a flange 12 extending radially outwardly, integrally from the boss 11 and a second cylindrical portion 13 integrally formed on an outer circumference of the flange 12. A spline hole 11a is formed in the center of the boss 11. The spline hole 11a is engaged with spline teeth of the shaft of the transmission. Thus, the hub flange 6 is not rotatable relative to the shaft of the transmission but is movable in the axial direction relative to the transmission shaft. The flange 12 is provided with a plurality of circular air ventilation openings 14 at an interval in the circumferential direction. The second cylindrical portion 13 extends from either side in an axial directions from the flange 12. A number of external teeth 13a extending in the axial direction are formed on the outer circumference of the second cylindrical portion 13. A plurality of air passage holes 19 are formed equidistantly in the circumferential direction in the second cylindrical portion 13 at the portion extending both sides in an axial directions. The air passage holes 19 extend through the second cylindrical portion 13 generally in the radial direction, with the radially outward ends thereof open to the bottom portion of an adjacent pair of external teeth 13a.

The flywheel ring 5 is concentrically disposed on the radial outer side of the second cylinder portion 13. The flywheel ring 5 is fixed to the flywheel 2 of the engine by a plurality of bolts 23. The flywheel ring 5 includes internal teeth 5a. Air passage grooves 24 are provided on the outer circumferential surface of the flywheel ring 5 at three positions at an interval in the axial direction. As shown in FIG. 6, the air passage grooves 24 are provided on the radial outer sides of the driven plates 8. As shown in FIGS. 6 and 8, each air passage groove 24 extends arcuately along the circumference of the flywheel 5. The bottom portion of each air passage groove 24 opens to the bottom surfaces of an adjacent pair of internal teeth 5a. The air passage grooves 24 extend longer in the circumferential direction, making it possible to effect good heat dispersion and reduction of the weight of the flywheel ring 5.

The annular frictional plate group 9 is arranged between the inside of the flywheel ring 5 and the second cylindrical portion 13 of the hub flange 6. The annular frictional plate group 9 is axially interposed between the flywheel 2 and a pressure plate 29 (described below).

The annular frictional plate group 9 is composed of four drive plates 7 and three driven plates 8 arranged alternatively in the axial direction. The drive plates 7 and the driven plates 8 are annular frictional plates made of the same material C/C composite as the composite member 80 (described below) and all arranged coaxially with the axis O—O of the multi-plate clutch 1. The drive plates 7 are provided with radial projections 26 in their outer circumferential portion. The projections 26 are engaged non-rotatably with the internal teeth 5a of the flywheel ring 5 but are slidable in the axial direction. The driven plates 8 are provided with radial projections 27 in their inner circumferential portion. The projections 27 are engaged non-rotatably with the external teeth 13a of the second cylindrical portion 13 but are slidable in the axial direction.

The clutch cover assembly 10 is mainly composed of a clutch cover 28, an annular pressure plate 29 arranged within the clutch cover 28, a diaphragm spring 30 which is a pressing member for urging the pressure plate 29 toward the flywheel 2, and a support mechanism 31 for supporting the diaphragm spring 30 on the clutch cover 28.

The clutch cover 28 is fixed to an end face of the flywheel ring 5 on a side facing the transmission by bolts 22. The clutch cover 28 is mainly made of aluminum to reduce its weight.

The pressure plate 29 is provided on the transmission side of the drive plate 7 disposed proximate to the transmission (the right side in FIG. 6). The pressure plate 29 is provided with radial projections 32 at its outer circumferential portion. The projections 32 are engaged non-rotatably with the internal teeth 5a of the flywheel ring 5 but are slidable in the axial direction. An annular raised portion 33 having a semicircular cross-section is formed on the inner circumferential portion of the pressure plate 29 on the transmission side.

The diaphragm spring 30 is formed of two overlapping disc-like members. The diaphragm spring 30 is composed of an annular elastic portion 30a and a plurality of lever portions 30b extending radially inwardly from the inner circumference of the annular elastic portion 30a. The lever portions 30b are provided at an equal interval in the circumferential direction. A slit is formed between the adjacent lever portions 30b. The diaphragm spring 30 is in contact with the annular raised portion 33 of the pressure plate 29 at its outer circumferential portion of the annular elastic portion 30a to thereby urge the pressure plate 29 toward the flywheel 2 (the left side in FIG. 6).

The diaphragm spring 30 is in contact with the annular raised portion 33 of the pressure plate 29 at its outer circumferential portion of the annular elastic portion 30a to thereby urge the pressure plate 29 toward the flywheel 2 (the left side of FIG. 1).

A release mechanism (not shown) is disposed adjacent to the inner circumferential portion of the diaphragm spring 30. When the release mechanism pushes the ends of the lever portions 30b of the diaphragm spring 30 toward the flywheel 2, the outer circumferential portion of the annular portion 30a of the diaphragm spring 30 is moved toward the transmission. Thus, the pressure of the diaphragm spring 30 for urging the pressure plate 29 toward the flywheel 2 is released. As a result, the clutch is disengaged.

The support mechanism 31 is mainly composed of a pair of first and second support annular members 35, 36 for supporting the inner circumferential portion of the annular portion 30a of the diaphragm spring 30, and a plurality of bolts 37 for fixing both of the annular support members 35, 36 to the clutch cover 28. The support members 35, 36 extend in the circumferential direction along the diaphragm spring 30, and have support portions 38 and 39 at the outer circumferential portions, respectively. The support portions 38 and 39 respectively have convex cross-sections such as semi-circular shape in portions in contact with the diaphragm spring 30. The support portion 38 of the first annular support member 35 is in contact with the diaphragm spring 30 from the transmission side (the right side in FIG. 6), and the support portion 39 of the second annular support member 36 is in contact with the diaphragm spring 30 from the flywheel 2 side (the left side in FIG. 6).

Figure 9:
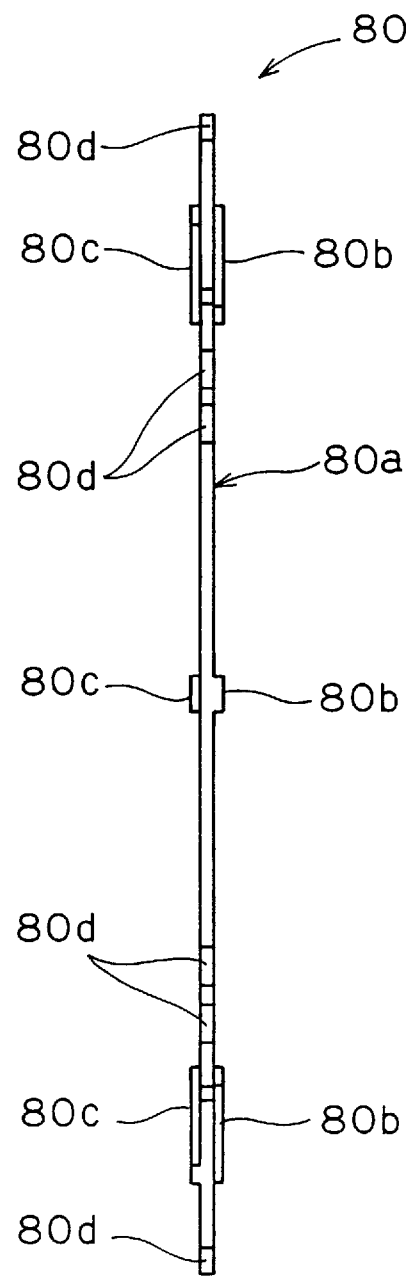
FIG. 9 is a side elevational view of a composite member shown removed from the multi-plate clutch depicted in FIG. 7.
Figure 10:
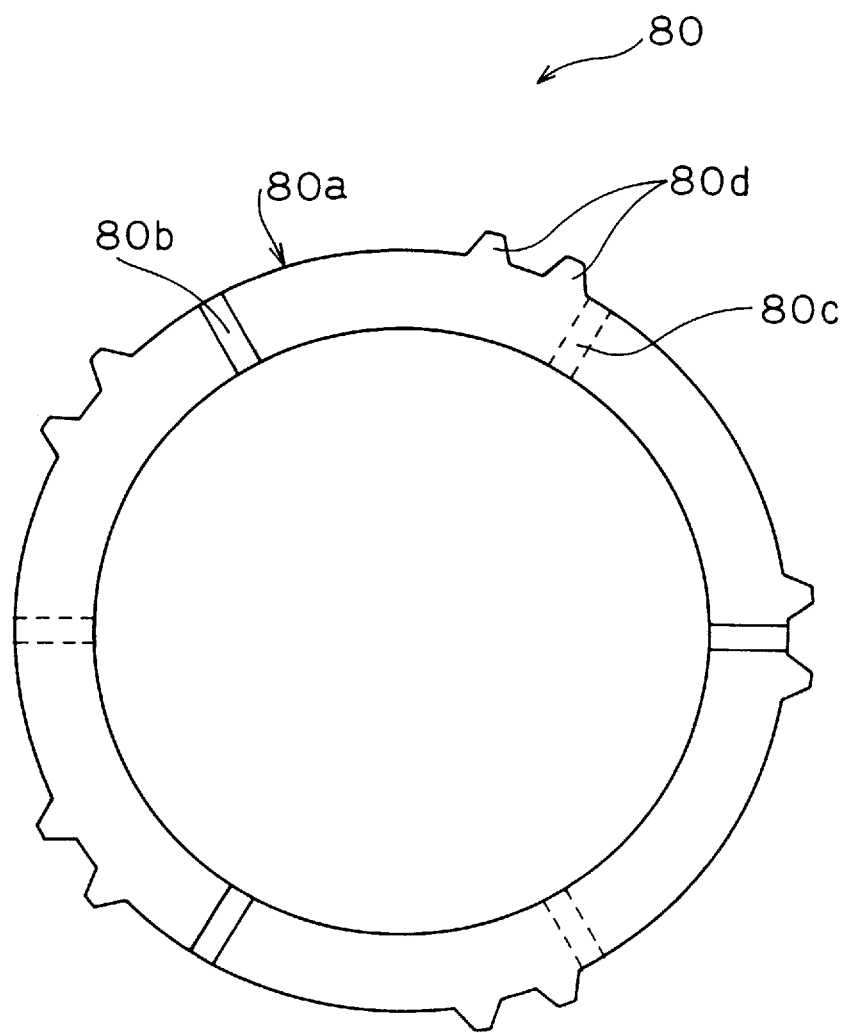
FIG. 10 is an elevational end view of the composite member depicted in FIG. 9.

The composite member 80 is an annular elastic member as shown in FIGS. 9 and 10, and is disposed between the plate proximate to the transmission (the right side in FIG. 6) and the pressure plate 29. The composite member 80 includes an annular portion 80a, three convex portions 80b provided on a first side surface of the annular portion 80a facing the transmission side (the right side in FIG. 6), three convex portions 80c provided on a second side surface of the annular portion 80a facing the engine side (the left side in FIG. 6), and radial projections 80d provided on the outer circumferential portion of the annular portion 80a. The projections 80d are engaged non-rotatably with the internal teeth 5a of the flywheel ring 5 but are slidable in the axial direction. In the composite member 80, the annular portion 80a is axially deformable between the convex portions 80b and the convex portions 80c, the axial spring rigidity of the composite member 80 can be set at low level. The rigidity of the composite member 80 is set in such a way that the reaction force thereof corresponds to the pressure load required to transmit a torque in a clutch engagement and disengagement process. The spring reaction force of the composite member 80 is therefore smaller than the pressure load of the diaphragm spring 30 in a state where the clutch is completely engaged. In a clutch engaged state, the composite member 80 is elastically deformed to a maximum. The maximum amount of the elastic deformation of the composite member 80 is set between 0.1 to 0.2 mm in accordance with the amount of thermal expansion of the various components of the clutch mechanism that might effect the position of the pressure plate 29 with respect to the flywheel 2.

Also, as a material for the composite member 80, C/C composite (carbon fiber reinforced composite material), which has excellent heat resistances, thermal shock resistances and wear properties and light-weighted is used.

The operation will now be described.

In a clutch engagement state, the annular elastic portion 30a of the diaphragm spring 30 urges the pressure plate 29 toward the flywheel 2. Thus, the pressure plate 29 is pushed toward the annular frictional plate group 9, allowing the drive plates 7 and the driven plates 8 to be interposed between the pressure plate 29 and the flywheel 2 and to be pressed into contact with each other. As a result, a torque inputted from the flywheel 2 to the flywheel ring 5 is transmitted to the hub flange 6 via the drive plates 7 and the driven plates 8, and further outputted to the transmission shaft via the hub flange 6.

An operation in the clutch engagement upon the start of a race will now be described. First, a driver engages the brake, increases the rotation of an engine, adjusts the position of a clutch and checks the point of partial engagement of the clutch. Since the spring reaction force of the composite member 80 corresponds to the pressure load required to transmit a torque in a clutch engaging and dis-engaging process, the point where the composite member 80 starts elastically deforming is a point within the clutch engagement and dis-engagement process. At this point, the driver keeps the clutch in a partially engaged state. Keeping on the clutch in a partially engaged state produces heat due to the friction between both plates 7 and 8. Consequently, the plates 7, 8 and the surrounding members thermally expand. The force due to thermal expansion in the axial direction is sufficient for the clutch to become engaged from a partially engaged state in the absence of the composite member 80. The drive plates 7 and the driven plates 8 are strongly compressed into contact with one another and clutch-transmitting torque is abruptly increased. In the multi-plate clutch 1 in accordance with the present invention, however, the composite member 80 absorbs the increase in axial thickness of the various members due to thermal expansion of each component by elastic deformation of the composite member 80. This makes it possible to prevent the abrupt increase of torque transmission due to the thermal expansion. Although the composite member 80 is also subjected to high temperature in a clutch engaging and dis-engaging process, C/C composite having excellent heat resistance is used as the composite member 80, thereby hardly degraded.

As the sign for start of the race is given, the driver releases the brake and engages the clutch. The composite member 80 is then deformed to a maximum and is interposed between the pressure plate 29 and the clutch plates 7 as a frictional member. In this case, there is little or no cushioning effect provided by the elastic deformation of the composite member 80 between the elastic deformation due to the absorption of the thermal expansion and the maximum elastic deformation. Normally such a cushioning effect delays the clutch engagement, and is therefore desirable at the starting time. In the composite member 80 of this embodiment, since the maximum amount of the elastic deformation is determined by calculating the axial dimension of thermal expansion of the various elements, the production of the extra cushioning effect is suppressed. Thus the acceleration at the starting time is maintained.

In order to put the clutch in a clutch dis-engaged state, the release mechanism (not shown) pushes the end of the lever portion 30b of the diaphragm spring 30 toward the flywheel 2, thereby moving the outer circumferential portion of the annular elastic portion 30a toward the transmission. Thus, the pressure between the drive plates 7 and the driven plates 8 is released to bring the clutch into a clutch disengaged state.

Advantages

In the multi-plate clutch, particularly the multi-plate clutch for car race in accordance with the present invention, the low-rigidity elastic means absorbs increased axial dimension of each component due to the thermal expansion generated upon keeping the clutch in a partially engaged state. This makes it possible to stabilize the clutch engagement point upon the high rotation and to prevent the abrupt increase of the clutch torque transmission due to the thermal expansion of various elements.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A multi-plate clutch used in a car for selectively transmitting torque from a flywheel to a transmission, comprising:

an input member configured for connection to a flywheel;

an output member disposed concentrically within said input member for relative rotation with respect thereto;

a first annular frictional plate, the outer circumferential portion of said first annular frictional plate being movable relative to said input member but non-rotatably engaged with said input member;

a second annular frictional plate, the inner circumferential portion of said second annular frictional plate being movable relative to said output member but non-rotatably engaged with said output member, said second annular friction plate being contactable with said first annular frictional plate;

a clutch pressing mechanism connected to said input member for selectively biasing said first and second annular frictional plates into engagement and disengagement with one another, said clutch pressing mechanism configured to provide a level of biasing force against said first and second annular frictional plates; and a low-rigidity elastic member co-axially disposed adjacent to at least one of said first and second annular frictional plates, said low-rigidity elastic member configured to provide an elastic reaction force smaller than said level of biasing force from said clutch pressing mechanism against said first and second annular frictional plates, said low-rigidity elastic member being configured to absorb increases in axial dimensions of said first and second annular frictional plates and said clutch pressing mechanism due to thermal expansion.

2. The multi-plate clutch according to claim 1, wherein a maximum amount of axial elastic deformation of said low-rigidity elastic member is no greater than 0.2 mm.

3. The multi-plate clutch according to claim 1, wherein said low-rigidity elastic member is a conically shaped elastic member disposed between said first and second annular frictional plates and said clutch pressure mechanism.

4. The multi-plate clutch according to claim 1, wherein said clutch pressure mechanism comprises:

a clutch cover disposed on one axial side of said input member opposite the flywheel such that said first and second annular frictional plates are confined between said clutch cover and the flywheel, said clutch cover being fixed to said input member;

a pressure plate having a belleville spring shape disposed between said clutch cover and said first and second annular frictional plates; and a diaphragm spring supported by said clutch cover, said diaphragm spring biasing said pressure plate toward the flywheel;

wherein said low-rigidity elastic member comprises said pressure plate.

5. The multi-plate clutch according to claim 1, wherein:

one of said first and second annular frictional plates is formed with a belleville spring shape and comprises said low-rigidity elastic member.

6. The multi-plate clutch according to claim 1, wherein:

said input member is formed with a first cylindrical portion;

said output member is formed with a second cylindrical portion disposed inward of an inner circumferential side of said first cylindrical portion;

said first annular frictional plate comprises a plurality of frictional plates disposed between said first cylindrical portion and said second cylindrical portion, the outer circumferential portion of said first annular frictional plate is engaged with said first cylindrical portion so as to movable relative to said first cylindrical portion in the axial direction but not to rotate relative to said first cylindrical portion;

said second annular frictional plate comprises a plurality of frictional plates, said second annular plates being disposed alternatingly adjacent to said first annular frictional plates in the axial direction, the inner circumferential portion of said second annular frictional plates is engaged with said second cylindrical portion so as to be movable relative to said second cylindrical portion in the axial direction but not to rotate relative to said second cylindrical portion.

7. The multi-plate clutch according to claim 1, wherein said low-rigidity elastic member is an annular plate formed with a plurality of projecting convex portions on opposing axial sides thereof.

8. The multi-plate clutch according to claim 7, wherein said low-rigidity elastic member is made of a composite material.

9. The multi-plate clutch according to claim 8, wherein said composite material includes carbon fiber.

* * * * *